Sept. 17, 1968     B. D. POWER     3,401,868
ROTARY VACUUM PUMPING EQUIPMENT

Filed Oct. 6, 1966     2 Sheets-Sheet 1

BASIL D. POWER,
INVENTOR

BY Hall·Houghton.

ATTORNEY

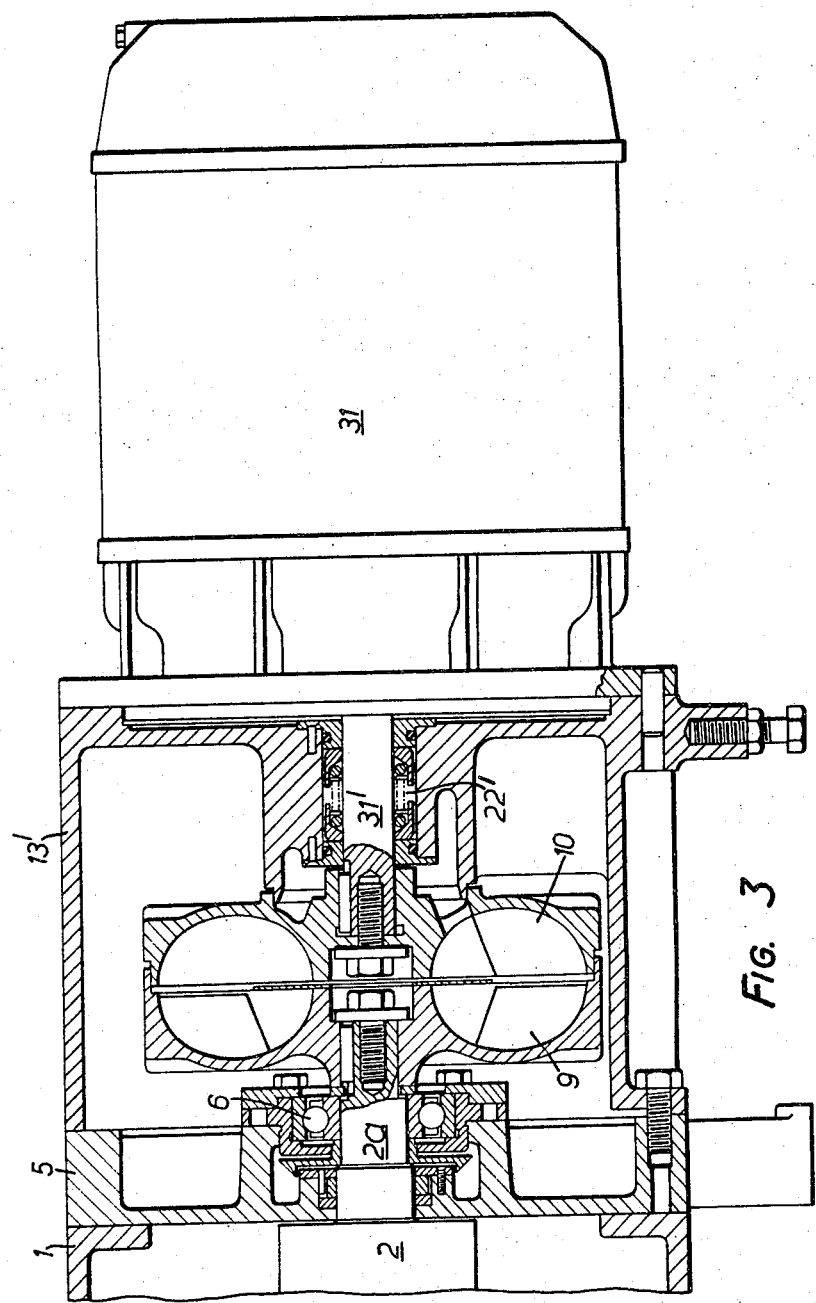

United States Patent Office 3,401,868
Patented Sept. 17, 1968

3,401,868
ROTARY VACUUM PUMPING EQUIPMENT
Basil Dixon Power, Horsham, England, assignor to Edwards High Vacuum International Limited, Crawley, England, a British company
Filed Oct. 6, 1966, Ser. No. 584,855
Claims priority, application Great Britain, Oct. 19, 1965, 44,192/65
5 Claims. (Cl. 230—15)

ABSTRACT OF THE DISCLOSURE

Rotary vacuum pumping equipment in which a rotary vacuum pump is driven through a fluid coupling and both the pump and coupling are housed in a single casing with a common sump for lubricating and coupling drive fluid. The arrangement enables economies to be made in relation to bearings, oil cooling arrangements, etc.

---

Figure 1:
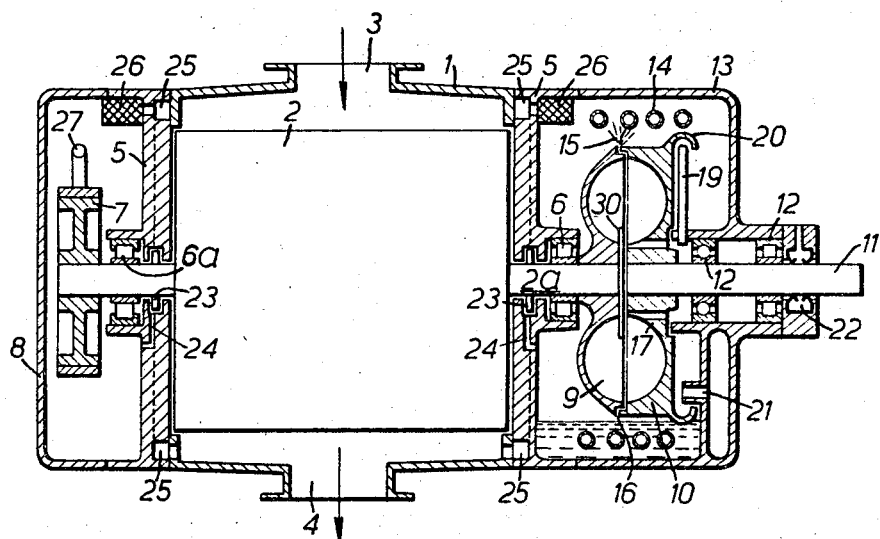

This invention relates to rotary vacuum pumping equipment.

It is a known problem in relation to such pumping equipment that the power required to compress the pumped gas gets less as the pumping operation proceeds. This is particularly true with respect to the high vacuum pump (or pumps), in a pumping combination of two or more pumps in series, both because the mass of gas handled in each pumping cycle becomes less as pressure is reduced and also because the pressure differential through which it is compressed gets less.

It is thus possible to rotate such a pump (or pumps) progressively faster as pressure is reduced without risk of mechanical strain or overheating and without exceeding the maximum load rating of a prime mover, the output of which was fully absorbed in driving the pump at comparatively slow rotational speed at the start of the pumping operation.

In favourable cases high rotational speed at low pressures and correspondingly high volumetric speed can be obtained using a prime mover of moderate power output. At higher pressures rotational speed is reduced so that mechanical strain is avoided and so that the limiting power output of the prime mover is never exceeded, but a useful pressure differential is still obtained. The fastest pumping action possible without overstrain of the apparatus is thus achieved.

Certain types of prime mover, commonly employed types of electric motor being a particular example, operate satisfactorily over only a very limited range of speeds so that it is not convenient to obtain the different rotational speeds desirable for the pump by varying the rotational speeds of the prime mover.

One way of driving the rotary vacuum pump so that the desirable characteristics described can be achieved, is by means of a fluid coupling or torque converter. When either of these devices is employed to transmit the drive from a prime mover to a pump it is possible for the prime mover to operate at approximately constant speed and with approximately constant power and torque output, whilst the pump operates at low speed when the load due to the pumped gas is high and at progressively higher speeds as the load is reduced until, at very light loads at the end of pump down, the pump rotational speed becomes nearly as high as the rotational speed of the prime mover and the torque and power output of the prime mover may fall to a comparatively low level.

Fluid couplings and torque converters employ a fluid, usually an oil, to transmit the drive from their driving to their driven members. This fluid is frequently used also to lubricate internal working parts. Particularly when such couplings are operated at "high slip" considerable power is dissipated inside the couplings, and both the couplings and the fluid they contain become overheated in a short time.

It is known practice to employ simple fluid couplings without special cooling arrangements to transmit the drive from a prime mover to a pump. Such couplings are limited to applications where "high slip" operation is only of brief duration. Since during the evacuation of a vessel "high slip" operation persists throughout the first part of pump-down there is therefore a limit to the size of vessel which a particular pumping combination can evacuate if dangerous overheating of the coupling during pump down is to be avoided. It is also known to employ a more complicated arrangement of fluid coupling and torque converter to transmit the drive, which avoids this limitation. In this case the oil or working fluid of the coupling or converter is circulated from the coupling, through an external heat exchanger and back to the coupling. The heat exchanger is normally supplied with cooling water and, with such an arrangement, a coupling can sustain "high slip" for an indefinite period. Such a coupling may require separate bearings, leak tight rotary seals for the extraction and the return of the working fluid and a heat exchanger provided solely for the purpose of coupling cooling. The arrangement has proved to be too expensive to be competitive in some applications and has the further disadvantage that it is bulky and may occupy an undesirably large space. Both types of coupling described above must be provided with shaft seals since the driving and the driven shafts emerge from a common casing and may rotate at different speeds. These seals must be of high quality if leakage of the working fluid from the coupling housing is to be avoided.

According to the present invention rotary vacuum pumping equipment includes a rotary vacuum pump and a fluid drive in combination therewith within a single housing, the driven member of the fluid coupling being mounted on the main pump drive shaft and the driving member of the coupling being carried on a shaft which projects through the housing, via suitable fluid sealing means, for driving by a prime mover. The shaft carrying the driving member may be an independent member journalled in the housing, or alternatively may be constituted by the shaft of a driving motor carried directly on the housing.

Preferably the arrangement of the equipment is such that oil provided for lubricating bearings and other moving parts of the pump is also employed as the working fluid for the fluid coupling and in addition is used for lubricating the bearings and other moving parts of the fluid coupling. Pump lubricating oil cooling equipment may then be provided with a heat exchanger sufficient to absorb and dissipate in addition the heat generated in fluid coupling when the latter is operated at maximum slip.

The use of common components, bearings, for example, and heat exchange arrangements, as well as a common lubricating and working fluid to serve both the pump and the coupling, and the integration of these two into a single unit as permitted by the invention result in economy and compactness allowing the use of a fully cooled fluid coupling arrangement competitively over a very wide range of applications.

In one embodiment of the invention the fluid drive is contained in a compartment within the housing of a pump, which also contains the pump bearing oil and the pump bearing oil cooler, the pump bearing oil being also employed as the working fluid for the fluid drive. Cooling means may be positioned within the compartment to cool the oil as it emerges as a spray from the fluid coupling.

Circulating means within the compartment may direct part of the oil to the pump and coupling bearings and continually to return cooled oil to the coupling.

Figure 2:
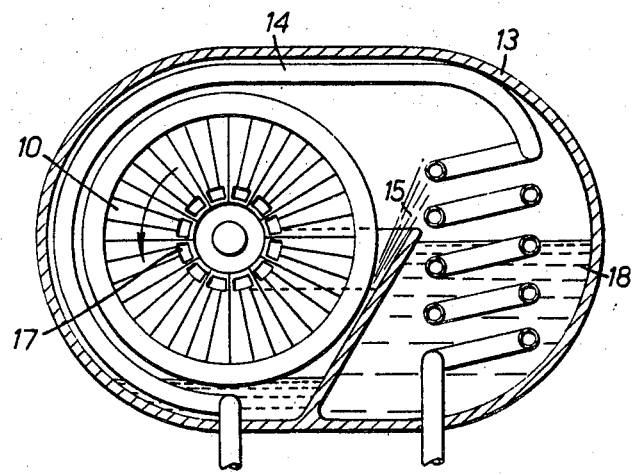

The invention will now be described in greater detail with reference to the accompanying drawings, of which:

FIGURE 1 is a diagrammatic longitudinal cross-section of one embodiment of the invention, FIGURE 2 is a section on the line II—II of FIGURE 1, and FIGURE 3 shows a diagrammatic view of a modified version of the invention.

A pump illustrated in the accompanying drawings is of the Roots blower type and consists of a main casing 1 with rotatably mounted inter-meshing rotors 2 which co-operate to produce a pumping action. The casing 1 is formed with inlet and outlet ports 3 and 4 respectively, and is closed at its two ends by covers 5 and 5' which carry bearings 6 and 6a respectively supporting the shaft 2a of one of the rotors. Timing gears 7 maintain the correct phase between the rotors, and a gear cover 8, mounted on the end cover 5, protects the timing gears. The end of the drive shaft 2a which projects through the cover 5 carries the turbine 9 of a fluid coupling. The impeller 10 of the fluid coupling is mounted in turn on a drive shaft 11 which is journalled in bearings 12 in a cover 13 mounted on the end cover 5.

Located within the cover 13 is a cooling coil 14 which in use cools the spray of oil generally indicated at 15 which is thrown out by the revolving fluid coupling. Oil cooling is essential since an appreciable amount of heat is generated within the coupling during prolonged evacuation or pumping at low vacuum.

At intermediate vacuum, heat generation in the coupling is at a reduced rate, but pump case, impellers and bearings, tend to become excessively hot, since heat generated in compressing gas is still high, but carry-away of heat in the gas stream is less rapid than at low vacuum. At this stage, the spray of oil over bearing housings, shaft ends and cover 5 and the feed of cool oil to bearings 6 provide valuable cooling for the pump parts. (Similar cooling is obtained at the other end of the pump by the spray of oil from the gears 7 in association with the finned cooling coil 27.) The oil spray also serves to lubricate the bearings 6. The oil leaves the coupling through a small circumferential clearance 16 and after cooling is reintroduced into the coupling through ports 17 from a reservoir 18 (shown in FIGURE 2). The reservoir 18 is replenished by the spray of oil 15.

An alternative arrangement of returning oil to the coupling is also illustrated in the drawings. To effect this, a scoop 19, carried by the cover 13, projects into an annular trough 20 formed on the back of the impeller 10. This trough is fed from the reservoir via a nozzle 21 and on rotation of the impeller, oil within the trough is removed by the scoop 19 and fed into the impeller through the ports 17. Oil flow along the various shafts in the unit is controlled by means of oil seals. Lubricated shaft seals 22 prevent the leakage of oil outwardly of the coupling and also prevent the leakage of air into the cover 13. Further seals 23 on the rotor shaft 2a prevent the flow of oil from the gear cover 8 and the coupling cover 13 into the blower chamber 1. Any oil trapped in these two seals 23 is returned to the appropriate part of the assembly by ducts 24. The interiors of the two housings 8 and 13 are connected to the outlet side of the pump by means of channels 25 which are provided with oil spray arrestors 26 to prevent loss of oil from the housings.

In the particular embodiment illustrated a cooling coil 27 is provided to cool the oil within the timing gear housing, and a baffle 30 is provided on the turbine 9 of the coupling to ensure smooth running during evacuation.

During operation of the unit the input drive shaft 11 is connected to a siutable electric motor which thus drives the pump by way of the fluid coupling. The maximum torque which may be transmitted by the coupling is easily adjustable by varying the oil charge in the coupling cover 13.

Referring now to FIGURE 3, the modified embodiment illustrated therein is generally similar to the embodiment of FIGURES 1 and 2, but instead of the drive shaft 11 being mounted in bearings in the cover 13 for connection to an electric motor, the motor 31 is bolted to the end of a cover 13' and the shaft 31' of the motor projects into the housing 13' through oil seals 22'. The driving member of the fluid coupling 10 is mounted directly on the end of the motor shaft 31'. The oil cooling and lubrication arrangements are similar to those employed in the first embodiment and have been omitted from FIGURE 3 for the sake of clarity. It will be noted that the embodiment of FIGURE 3 eliminates the necessity for bearings 12, since the motor bearings are used to support the driving member 10. This embodiment can, of course, only be used where the driving member is to be driven at motor speed, but in such circumstances it enables construction of the coupling to be simplified. The need for the bearings 12 is, as explained above, eliminated, and additional transmission elements such as gears or belts are also eliminated. A very compact and economical construction therefore results.

Although the invention has been described with reference to an embodiment using a fluid coupling it is within the scope of the invention to employ a fluid torque converter coupling.

I claim:

1. Rotary vacuum pumping equipment comprising in combination
    (a) a rotary vacuum pump including a drive shaft,
    (b) a fluid coupling including an input member and an output member, said output member being connected to said drive shaft,
    (c) a main drive shaft carrying said input member, and
    (d) a single housing encasing said pump and said fluid coupling and including a common sump adapted to contain and feed oil for lubricating and cooling the pump and also as the working fluid of the fluid coupling.

2. Rotary vacuum pumping equipment as claimed in claim 1 in which said main drive shaft is the shaft of a driving motor carried directly on the housing.

3. Rotary vacuum pumping equipment as claimed in claim 1 including oil cooling equipment proivded with a heat exchanger sufficient to absorb from the oil and dissipate both the heat generated in the pump and also the heat generated in the fluid coupling when the latter is operated at maximum slip.

4. Rotary vacuum pumping equipment as claimed in claim 3 in which the housing includes a compartment which contains the fluid drive, the sump and the oil cooler.

5. Rotary vacuum pumping equipment as claimed in claim 4 in which the oil cooler is disposed in the compartment to intercept oil emerging as a spray from the fluid coupling during use, circulating means being provided within the compartment to direct part of the oil from the sump to the pump coupling bearings and to return cooled oil continuously to the coupling.

References Cited

UNITED STATES PATENTS 2,672,954   3/1954   Bennett _____ 188—90
2,785,325   3/1957   Keyner.

ROBERT M. WALKER, *Primary Examiner.*